United States Patent [19]
Smit

[11] Patent Number: 5,515,771
[45] Date of Patent: May 14, 1996

[54] COFFEE BREWING APPARATUS WITH REMOVABLE ANTI-LEAKAGE FILTER

[75] Inventor: Gerard C. Smit, Amerongen, Netherlands

[73] Assignee: Smitdesign B.V., Amerongen, Netherlands

[21] Appl. No.: 346,633

[22] Filed: Nov. 30, 1994

[30] Foreign Application Priority Data

Nov. 30, 1993 [NL] Netherlands ............... 9302082

[51] Int. Cl.$^6$ ................................. A47J 31/24
[52] U.S. Cl. ................. 99/280; 99/295; 99/299
[58] Field of Search ................ 99/279, 280, 281, 99/282, 283, 295, 299, 304, 306

[56] References Cited

U.S. PATENT DOCUMENTS

| | | | |
|---|---|---|---|
| 3,348,468 | 10/1967 | Eisendrath | 99/282 |
| 4,467,707 | 8/1984 | Amiot | 99/299 |
| 4,608,916 | 9/1986 | Becker et al. | 99/305 |
| 4,667,587 | 5/1987 | Wunder | 99/299 |
| 4,713,526 | 12/1987 | Smit | 99/283 |
| 4,748,901 | 6/1988 | Burmeister | 99/306 |
| 4,811,657 | 3/1989 | Rixen | 99/299 |
| 4,833,978 | 5/1989 | Martone et al. | 99/280 |
| 4,892,522 | 1/1990 | Wunder et al. | 99/299 |
| 5,063,837 | 11/1991 | Precht | 99/299 |
| 5,133,247 | 7/1992 | Pastrick | 99/299 |
| 5,168,794 | 12/1992 | Glucksman | 99/305 |
| 5,233,914 | 8/1993 | English | 99/282 |
| 5,325,764 | 7/1994 | Nakamura et al. | 99/283 |

FOREIGN PATENT DOCUMENTS

| | | | |
|---|---|---|---|
| 0283569 | 9/1988 | European Pat. Off. . | |
| 0350199 | 1/1990 | European Pat. Off. . | |
| 3602231 | 7/1987 | Germany | 99/283 |
| 8815832 | 1/1990 | Germany . | |
| 616064 | 3/1980 | Switzerland . | |
| 2258141 | 2/1993 | United Kingdom . | |

*Primary Examiner*—David Scherbel
*Assistant Examiner*—Tony G. Soohoo
*Attorney, Agent, or Firm*—Merchant, Gould, Smith, Edell, Welter & Schmidt

[57] ABSTRACT

A coffee brewing apparatus comprising a housing (1) including a water reservoir, a coffeepot arrangement position (2), a filter holder (3), an on/off subswitch (4) for switching the entire apparatus on and off, and a shut-off valve (5) connected with the filter holder (3) for closing the filter holder (3), the on/off subswitch (4) and the shut-off valve (5) being responsive to the presence/absence of a coffeepot (6) at the coffeepot arrangement position (2), and further comprising a filter holder support bracket (7) connected with the housing (1), which bracket (7) comprises an operating element (8) adapted for cooperation with the coffeepot (6) and for operation of the shut-off valve (5) on the one hand and the on/off subswitch (4) on the other, while the filter holder (3) is freely placeable on the filter holder support bracket (7) and, in the condition wherein it is placed on the filter holder support bracket (7), is locked in vertical direction by locking means (9, 10).

10 Claims, 4 Drawing Sheets

COFFEE BREWING APPARATUS WITH REMOVABLE ANTI-LEAKAGE FILTER

This invention relates to a coffee brewing apparatus comprising a housing including a water reservoir, a coffeepot arrangement position, a filter holder, an on/off subswitch for switching the entire apparatus on and off, and a shut-off valve connected with the filter holder for closing the filter holder, the on/off subswitch and the shut-off valve being responsive to the presence/absence of a coffeepot at the coffeepot arrangement position.

Such coffee brewing apparatuses are known from practice and their most important disadvantage is that the filter holder is either hinged to the housing for swivelling movement or slidably connected with a lid of the coffee brewing apparatus by way of a guide track. This was considered necessary to prevent the filter holder from being pushed upwards by the upwardly directed force which the coffeepot, as it being placed on the coffeepot arrangement position, exerts on a valve lever of the shut-off valve of the filter holder. However, sliding a filter holder into a guide track is an operation which must be performed accurately because otherwise the filter holder may easily be positioned incorrectly. An incorrectly positioned filter holder may slip and thereby cause spill of boiling water, which can give rise to a particularly dangerous situation. The most important drawbacks of filter holders which are hinged to the housing of the coffee brewing apparatus are that they cannot be simply removed for the purpose of cleaning them and that they are constructively complicated.

The object of the invention is to provide a coffee brewing apparatus of the type mentioned in the opening paragraph hereof without the above-mentioned drawbacks.

To that end, the coffee brewing apparatus is characterized by a filter holder support bracket, provided above the coffeepot arrangement position and connected with the housing, which comprises an operating element adapted for cooperation with the coffeepot and for operation of the shut-off valve on the one hand and the on/off subswitch on the other, while the filter holder is freely placeable on the filter holder support bracket and, in the condition wherein it is placed on the filter holder support bracket, is locked in vertical direction by locking means.

A coffee brewing apparatus of such design combines the advantageous features of a filter holder shut-off valve openable by the coffeepot and an on/off subswitch operable by the coffeepot, with a freely placeable and removable filter holder. Such a coffee brewing apparatus can therefore be kept clean in simple manner and is convenient in use. The locking means prevent the filter holder from being pressed upwards in vertical direction as the coffeepot is being positioned.

In further elaboration of the invention, the locking means may be designed as at least one projection connected with the filter holder support bracket, which projection is adapted for engaging a locking recess provided in the filter holder. Such a locking provision is simple in construction and can therefore be realized in an economically favorable manner.

In an alternative elaboration, the locking means may be designed as at least one projection connected with the housing or the water reservoir, which projection is adapted for engaging the upper edge of the filter holder. Such a design of the locking means has substantially the same advantages as the projection or projections connected with the filter holder support bracket.

According to a further elaboration of the invention, the filter holder support bracket comprises a receiving cavity, while the filter holder, at the underside thereof, is provided with a particular contour of such design that the filter holder can be placed in the receiving cavity in one position only. This ensures that when the filter holder is being placed, it is positioned such that the shut-off valve can always cooperate with the operating element. Moreover, as a consequence, the valve may be provided with a simple valve stem which the operating element can engage.

The contour of the underside of the filter holder can for instance be substantially rectangular and snugly receivable in the substantially rectangular receiving cavity. A filter holder of such design can be placed on the filter holder support bracket in one manner only and moreover has an aesthetically attractive form.

In a design of the coffee brewing apparatus according to the invention which is advantageous from the point of view of production technique, the housing is an extruded section which has a crescent-shaped cross-section in a horizontal plane, the concave side of the housing partly surrounding the coffeepot arrangement position and supporting the filter holder support bracket.

A housing of such design seems small but actually accommodates a considerable volume, so that it can incorporate a surprisingly large water reservoir. Moreover, to obtain the housing, only a part having a particular height needs to be sawn off the extruded section, which is particularly advantageous from the point of view of production technique. Further, through simple inversion of the housing, a coffee brewing apparatus for right-handed as well as one for left-handed users can be manufactured.

To clarify the invention, some embodiments of the coffee brewing apparatus will be described, by way of example only, with reference to the drawing.

Figure 1:
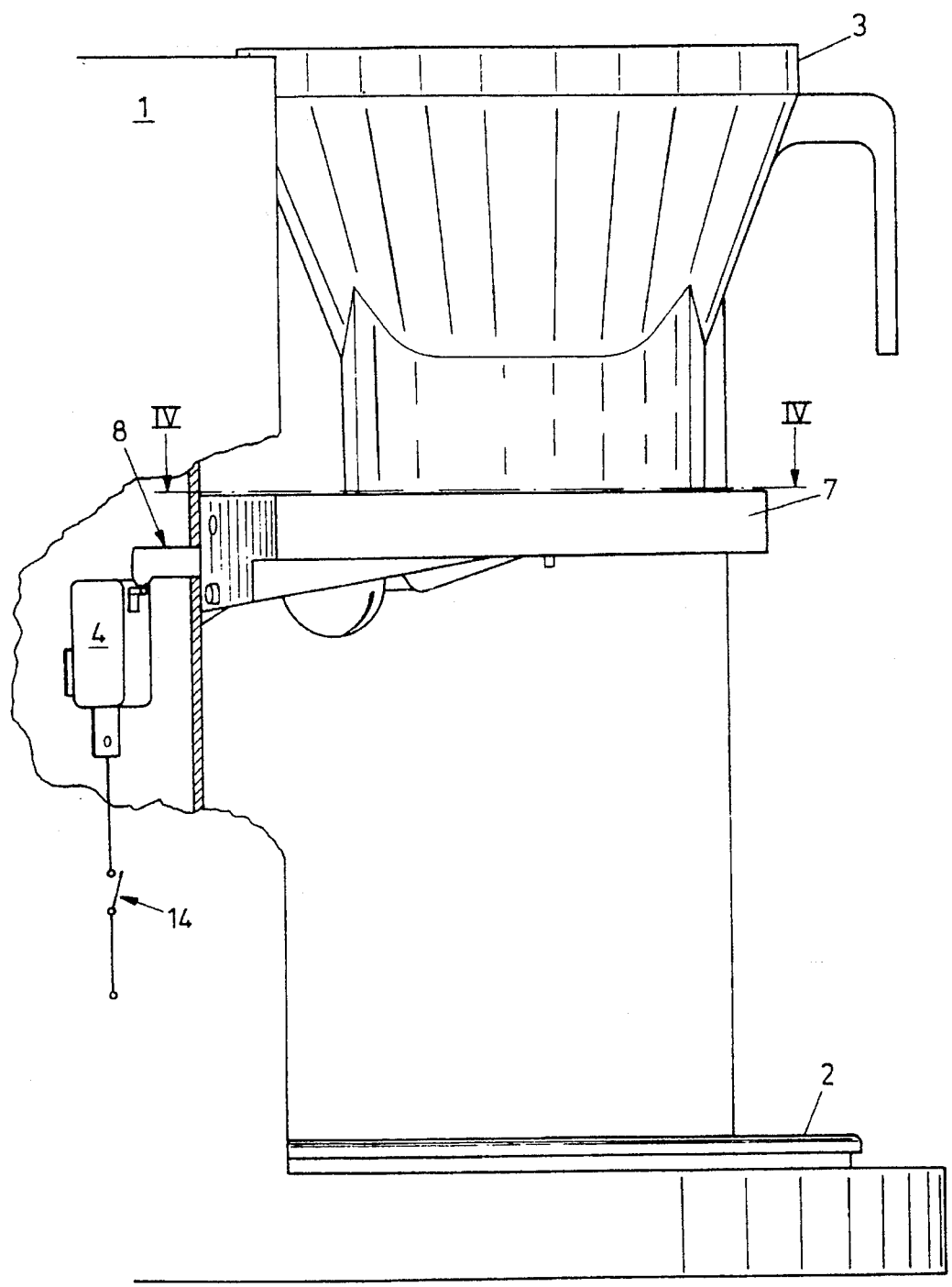
FIG. 1 is a side elevational view of the apparatus with the housing partly broken away.

The exemplary embodiments shown comprise a housing 1 including a water reservoir, a coffeepot arrangement position 2, a filter holder 3, an on/off subswitch 4 for switching the entire apparatus on and off, and a shut-off valve 5 for closing the filter holder 3, the on/off subswitch 4 and the shut-off valve 5 being responsive to the presence/absence of a coffeepot 6 at the coffeepot arrangement position 2. Additionally, the exemplary embodiment comprises a filter holder support bracket 7, provided above the coffeepot arrangement position 2 and connected with the housing 1, which comprises an operating element 8 adapted for cooperation with the coffeepot 6 and for operation of the shut-off valve 5 on the one hand and the on/off subswitch 4 on the other. According to the invention, the filter holder 3 is freely placeable onto the filter holder support bracket 7 and the filter holder 3 is locked in vertical direction by locking means 9, 10, 11. The shut-off valve 5 is hingedly connected with the filter holder 3 and is pre-tensioned into the closed position. The operating element 8 is hingedly connected with the filter holder support bracket 7 and is pre-tensioned into a condition wherein the on/off subswitch 4 is switched off. When the filter holder 3 is disposed on the support bracket 7 and when moreover the coffeepot 6 is placed on the coffeepot arrangement position 2, the shut-off valve 5 of the filter holder 3 is open. In all other situations, the shut-off valve 5 of the filter holder 3 is closed. For setting the on/off switch 4 in the on-position, it is merely required that the coffeepot 6 be placed on the coffeepot arrangement position 2. The operating element may be designed as a lever 16 mounted for hinged movement about a horizontal axis 15, the on/off subswitch 4 being operated through a first end 16a of lever 16, which extends into the housing 1, and the shut-off valve 5 of the filter holder 3 being operated through a second end 16b of lever 16. The second end 16b of the operating element 8 may, at the lower end thereof, be provided with a spherical profile surface 17 which, as the coffeepot 6 is being placed, engages the top side of the coffeepot 6 or of the lid thereof and is thereby gradually pushed upwards.

It should be noted that the present coffee brewing apparatus not only comprises an on/off subswitch 4 operated by the coffeepot by way of the operating element 8, but also, as will be clear, a user-operable on/off main switch 14, which is connected in series with the above-mentioned on/off subswitch 4 operated by the operating element 8.

Figure 2:
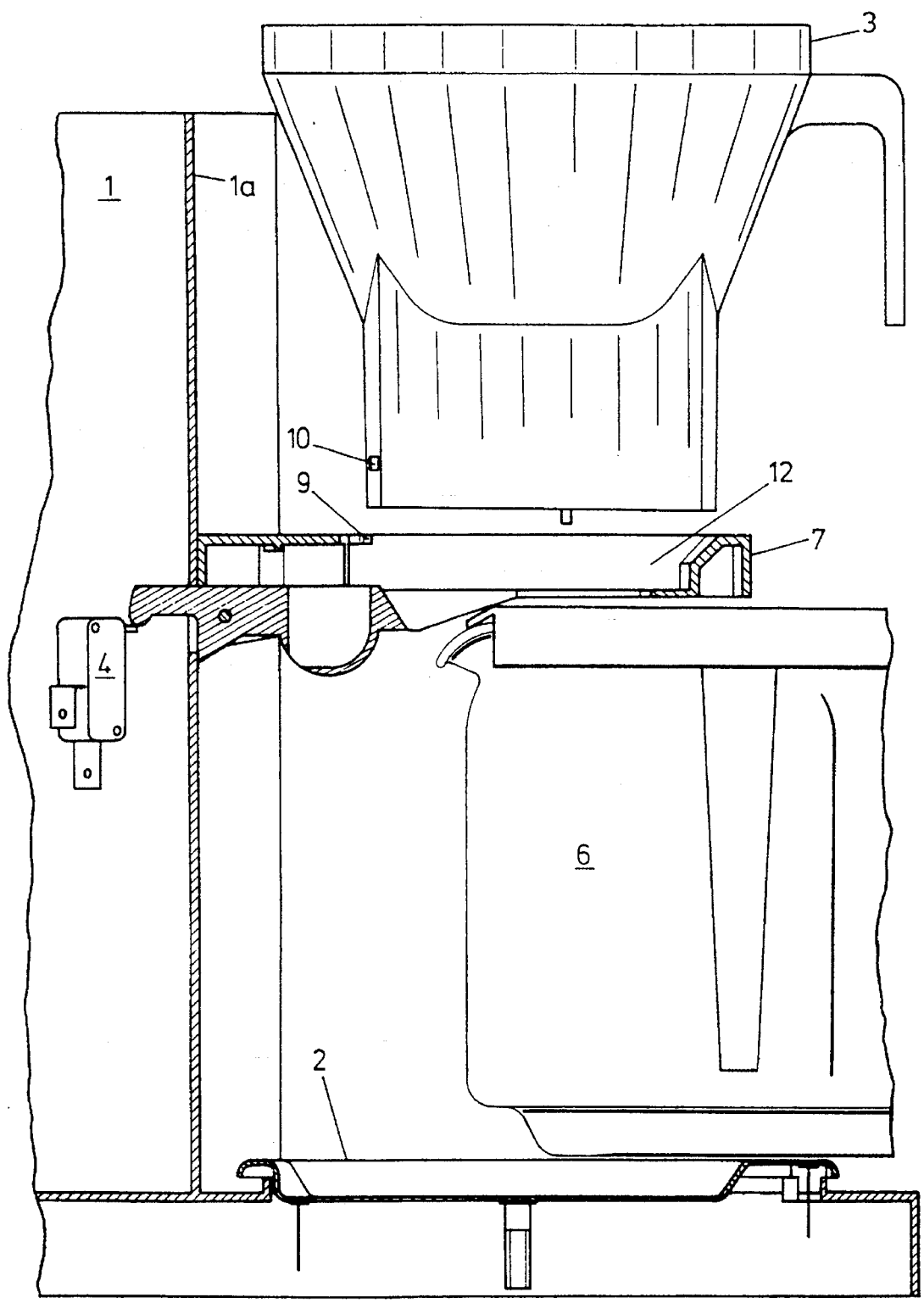
FIG. 2 is a vertical sectional view of the filter holder support bracket, with the filter holder and coffeepot taken out, according to a first embodiment of the apparatus.

In the exemplary embodiment shown in FIG. 2, it is clearly visible that the locking means 9, 10 are designed as at least one projection 9 connected with the filter holder support bracket 7, which projection is adapted for engaging locking recesses 10 provided in the filter holder 3.

Figure 3:
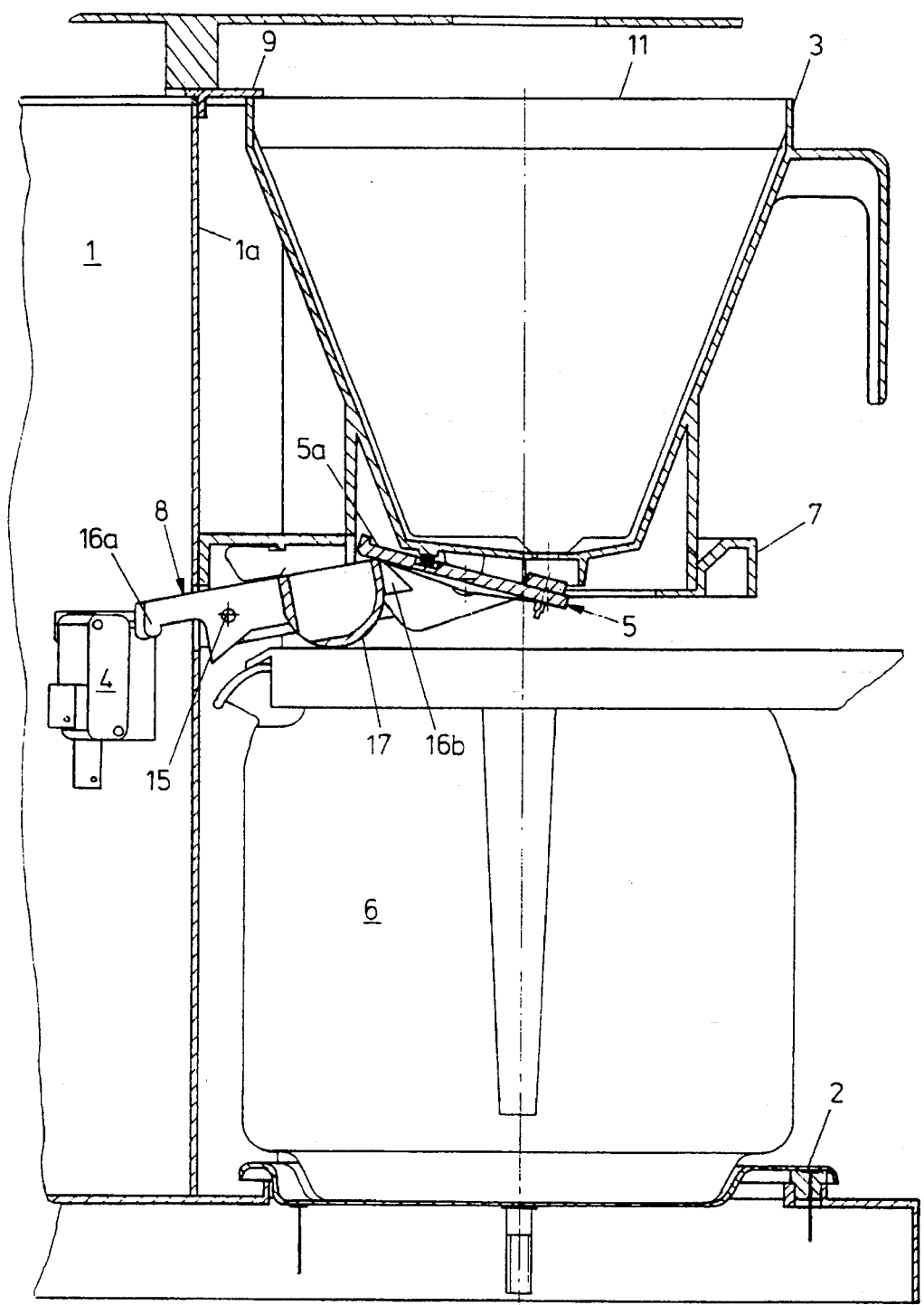
FIG. 3 is a sectional view of a second exemplary embodiment of the apparatus.

The alternative exemplary embodiment shown in FIG. 3 is characterized in that the locking means 9, 11 are designed as at least one projection connected with the housing or the water reservoir, which projection is adapted for engaging the upper edge 11 of the filter holder 3.

Both exemplary embodiments shown comprise a filter holder support bracket 7 with a receiving cavity 12. In the exemplary embodiments shown, the filter holder 3 is provided, at the lower end thereof, with a rectangular contour 13, so that the filter holder 3 is placeable in the receiving cavity 12 in one position only. This ensures that the valve lever 5a of the shut-off valve 5 can always cooperate with the operating element 8.

Figure 4:
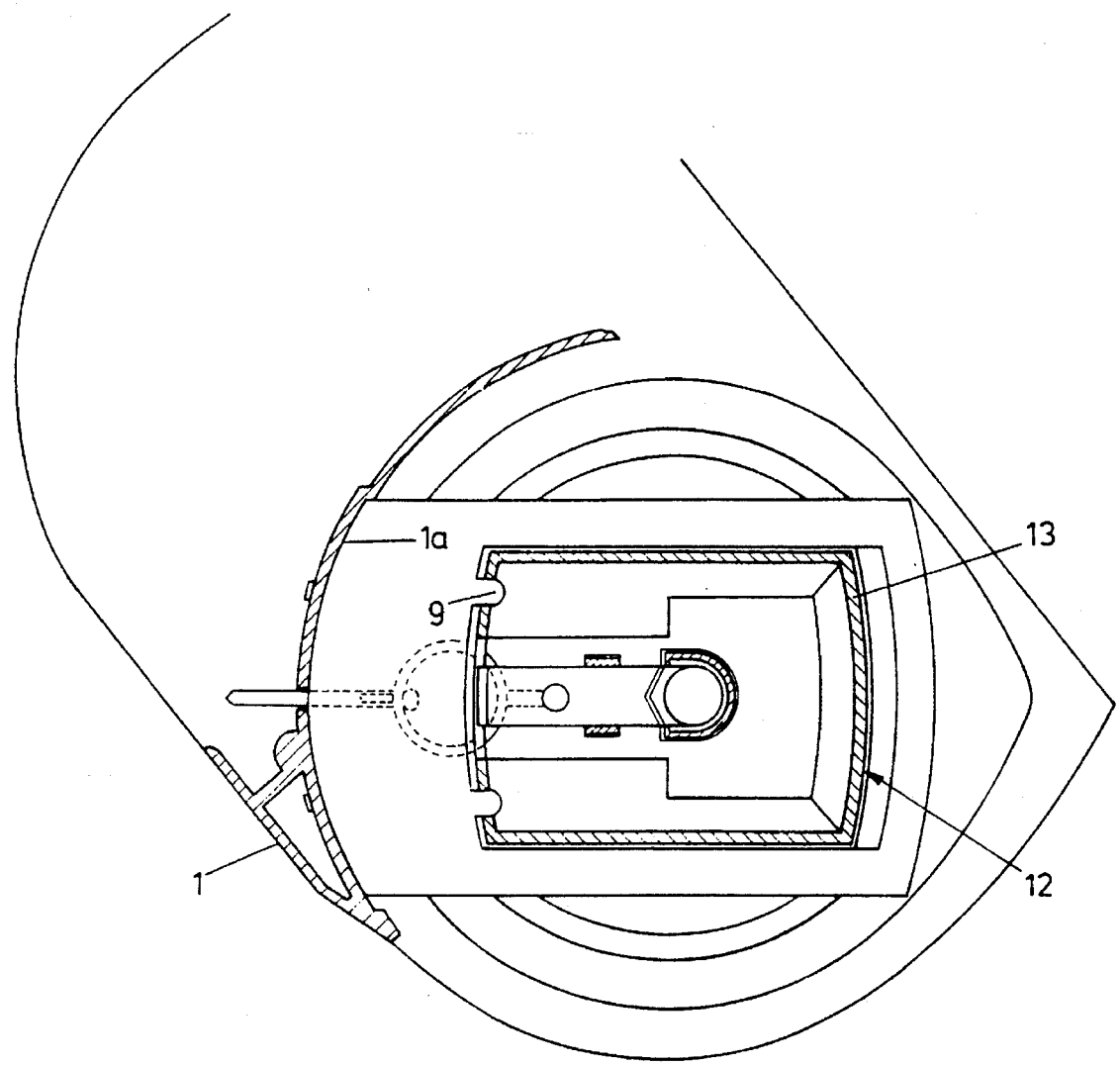
FIG. 4 is a section taken on line IV—IV of FIG. 1.

In an aesthetically attractive embodiment, which can be manufactured economically, the housing 1 is produced from an extruded section 1 which has a crescent-shaped cross-section in a horizontal plane, as is clearly apparent from FIG. 4. The concave side 1a of the housing 1 partly surrounds the coffeepot arrangement position 2 and supports or carries the filter holder support bracket 7. The advantage of the crescent-shaped profile of the housing 1 is that the housing looks compact while yet comprising a substantial volume. Moreover, by inverting the section 1, coffee makers can be manufactured which are suitable for right-handed and left-handed users, respectively.

It will clear that the invention is not limited to the exemplary embodiments described but various modifications are possible within the context of the invention.

I claim:

1. A coffee brewing apparatus having a coffeepot placed in a coffeepot operating position therein, the apparatus comprising:

a housing including a water reservoir;

a filter holder;

a subswitch disposed in the housing for switching the apparatus on and off;

a shut-off valve connected with the filter holder for closing the filter holder, the subswitch and the shut-off valve being responsive to presence of the coffeepot at the coffeepot operating position;

a filter holder support bracket being connected to the housing, the coffeepot being disposable underneath the filter holder support bracket when the coffeepot is placed in the coffeepot operating position;

locking means for releasably locking the filter holder in the filter holder support bracket, the locking means being disposed on the filter holder and the housing; and wherein the filter holder support bracket comprises an operating element engageable with the coffeepot when said coffeepot is placed in the coffeepot operating position, and said operating element thereby opening the shut-off valve and operating the subswitch to switch on the apparatus hand.

2. A coffee brewing apparatus according to claim 1, wherein the locking means includes a projection connected with the housing, the projection engaging an upper edge of the filter holder.

3. A coffee brewing apparatus according to claim 1, wherein the filter holder support bracket is provided with a receiving cavity, the filter holder, at an underside thereof, is provided with a contour such that the filter holder is placeable in the receiving cavity in one position only.

4. A coffee brewing apparatus according to claim 3, wherein the contour of the underside of the filter holder is substantially rectangular and snugly receivable in the receiving cavity of a substantially rectangular shape.

5. A coffee brewing apparatus according to claim 1, wherein the housing is an extruded section which has a crescent-shaped cross-section in a horizontal plane, a concave side of the housing partly surrounding the coffeepot at the coffeepot operating position and supporting the filter holder support bracket.

6. A coffee brewing apparatus having a coffeepot placable in a coffeepot operating position therein, the apparatus comprising:

a housing including a water reservoir;

a filter holder;

a subswitch disposed in the housing for switching the apparatus on and off;

a shut-off valve connected with the filter holder for closing the filter holder, the subswitch and the shut-off valve being responsive to presence of the coffeepot at the coffeepot operating position;

a filter holder support bracket being connected to the housing, the coffeepot being disposable underneath the filter holder support bracket when the coffeepot is placed the coffeepot operating position;

locking means for releasably locking the filter holder in the filter holder support bracket the locking means being disposed on the filter holder and the filter holder support bracket; and wherein the filter holder support bracket comprises an operating element engageable with the coffeepot when said coffeepot is placed in the coffeepot operating position, and said operating element thereby opening the shut-off valve and operating the subswitch to switch on the apparatus.

7. A coffee brewing apparatus according to claim 6, wherein the locking means includes a projection connected with the filter holder support bracket and a locking recess provided in the filter holder, the projection engaging the locking recess so as to lock the filter holder in the filter holder support bracket.

8. A coffee brewing apparatus according to claim 6, wherein the filter holder support bracket is provided with a receiving cavity, the filter holder, at an underside thereof, is provided with a contour such that the filter holder is placeable in the receiving cavity in one position only.

9. A coffee brewing apparatus according to claim 8, wherein the contour of the underside of the filter holder is substantially rectangular and snugly receivable in the receiving cavity of a substantially rectangular shape.

10. A coffee brewing apparatus according to claim 6, wherein the housing is an extruded section which has a crescent-shaped cross-section in a horizontal plane, a concave side of the housing partly surrounding the coffeepot at the coffeepot operating position and supporting the filter holder support bracket.

* * * * *

UNITED STATES PATENT AND TRADEMARK OFFICE
CERTIFICATE OF CORRECTION

PATENT NO. : 5,515,771

DATED : May 14, 1996

INVENTOR(S) : Gerard C. Smit

It is certified that error appears in the above-identified patent and that said Letters Patent is hereby corrected as shown below:

In column 4, line 13 (last line of Claim 1), delete "hand" after the word "apparatus".

In column 4, line 47 (Claim 6), insert --in-- after "placed".

Signed and Sealed this

Twenty-sixth Day of November 1996

*Attest:*

BRUCE LEHMAN

*Attesting Officer*     *Commissioner of Patents and Trademarks*